UNITED STATES PATENT OFFICE.

FRITZ HOFMANN AND KONRAD DELBRÜCK, OF ELBERFELD, AND KURT MEISENBURG, OF LEVERKUSEN, NEAR COLOGNE, GERMANY, ASSIGNORS TO FARBENFABRIKEN VORM. FRIEDR. BAYER & CO., OF ELBERFELD, GERMANY, A CORPORATION OF GERMANY.

PROCESS OF PREVENTING CAOUTCHOUC SUBSTANCES FROM GETTING STICKY AND RESINOUS.

1,039,741. Specification of Letters Patent. Patented Oct. 1, 1912.

No Drawing. Application filed December 29, 1911. Serial No. 668,519.

*To all whom it may concern:*

Be it known that we, FRITZ HOFMANN and KONRAD DELBRÜCK, residing at Elberfeld, and KURT MEISENBURG, residing at Leverkusen, near Cologne, Germany, doctors of philosophy, chemists, citizens of the German Empire, have invented new and useful Improvements in Processes of Preventing Caoutchouc Substances from Getting Sticky and Resinous, of which the following is a specification.

By earlier applications Ser. Nos. 578607, 578608, 588173, 594095, 594557, 652641, 658536 processes for the manufacture and production of substances similar to caoutchouc are protected, which processes consist in heating butadiene compounds, such as for instance erythrene, isoprene, beta-gamma-dimethylerythreue, alpha-methylbutadiene, alpha-dimethylbutadiene, tetramethylbutadiene, beta-ethylbutadiene, with or without the addition of agents accelerating polymerization, or in submitting these hydrocarbons to the action of alkaline or alkaline earth metals or of mixtures, alloys or amalgams thereof, or in submitting them either at ordinary temperature or heated to the action of organic substances such as starch, albumen, urea, glycerin or compounds of a similar behavior. The caoutchouc substances thus obtained frequently suffer from the disadvantage that they get sticky and turn partially resinous after having been rolled into sheets and dried in the air. We have now discovered that this deterioration can be prevented by treating the caoutchouc substances with alkaline agents.

In order to illustrate the new process more fully the following examples are given, the parts being by weight:—

Example 1: 100 parts of the caoutchouc like product obtained by the action of heat from beta-gamma-dimethylbutadiene are rolled into thin sheets. The resulting white or more or less colored sheets are then immersed for 24 hours in water containing 2 per cent. of ammonia and dried in the usual way in the open air or *in vacuo*.

Example 2: 500 parts of the caoutchouc substance obtained by heating beta-gamma-dimethylbutadiene are rolled into thin sheets which are then treated for 1 to 2 days with a solution of dimethylamin. The sheets assume on drying a yellowish tint and keep in excellent condition for a long time.

Instead of the alkaline agents mentioned in the examples others can be used, as well as other caoutchouc substances obtained by polymerization of butadiene compounds or mixtures thereof.

We claim:—

Process for preventing the deterioration of synthetic caoutchouc substances, obtainable from butadiene compounds, which process consists in treating these substances with alkaline compounds, substantially as described.

In testimony whereof we have hereunto set our hands in the presence of two subscribing witnesses.

FRITZ HOFMANN. [L. S.]
KONRAD DELBRÜCK. [L. S.]
KURT MEISENBURG. [L. S.]

Witnesses:
HELEN NUFER,
A. NUFER.